United States Patent
Sarab (10) Patent No.: US 10,089,183 B2
(45) Date of Patent: Oct. 2, 2018

(54) METHOD AND APPARATUS FOR RECONSTRUCTING AND CHECKING THE CONSISTENCY OF DEDUPLICATION METADATA OF A DEDUPLICATION FILE SYSTEM

(71) Applicant: Atlantis Computing, Inc., Mountain View, CA (US)

(72) Inventor: Farshid Eslami Sarab, San Jose, CA (US)

(73) Assignee: HIVEIO INC., Hoboken, NJ (US)

( * ) Notice: Subject to any disclaimer, the term of this patent is extended or adjusted under 35 U.S.C. 154(b) by 427 days.

(21) Appl. No.: 14/815,494

(22) Filed: Jul. 31, 2015

(65) Prior Publication Data

US 2017/0031768 A1 Feb. 2, 2017

(51) Int. Cl.
*G06F 17/00* (2006.01)
*G06F 17/30* (2006.01)
*G06F 11/14* (2006.01)

(52) U.S. Cl.
CPC .... *G06F 11/1446* (2013.01); *G06F 17/30156* (2013.01); *G06F 17/30371* (2013.01)

(58) Field of Classification Search
CPC ............... G06F 17/30156; G06F 17/30159
See application file for complete search history.

(56) References Cited

U.S. PATENT DOCUMENTS

| 8,442,952 B1 * | 5/2013 | Armangau ........ G06F 17/30159 706/14 |
| 8,996,800 B2 | 3/2015 | Venkatesh et al. |
| 2014/0229451 A1 * | 8/2014 | Venkatesh ......... G06F 17/30156 707/692 |

* cited by examiner

*Primary Examiner* — Cheryl Lewis
(74) *Attorney, Agent, or Firm* — Womble Bond Dickinson (US) LLP (57) ABSTRACT

A method and apparatus is disclosed herein for checking the consistency of deduplication metadata after an unclean shutdown of a deduplication computing system. The method may include mounting a deduplication file system of a deduplication computing system after an unclean shutdown of the deduplication computing system. Furthermore, the method may include initiating a reconstruction and consistency check of deduplication metadata associated with the deduplication file system. Furthermore, the method may include receiving a user operation prior to completion of the reconstruction and consistency check of the deduplication metadata, and processing the user operation in parallel with the reconstruction and consistency check of the deduplication metadata.

24 Claims, 7 Drawing Sheets

METHOD AND APPARATUS FOR RECONSTRUCTING AND CHECKING THE CONSISTENCY OF DEDUPLICATION METADATA OF A DEDUPLICATION FILE SYSTEM

TECHNICAL FIELD

Embodiments of the invention relate to the field of data storage, and more particularly, to reconstruction and checking the consistency of deduplication metadata after an unclean shutdown of a deduplication computing system.

BACKGROUND

Data deduplication is used in various computing environments, such as virtualized and non-virtualized computing environments, to minimize repeated data. For example, in a virtualized computing environment, more than one virtual machine can be provisioned on a host machine resulting in a high degree of repeated data. As another example, in a physical computer system (e.g., non-virtualized environment), many blocks of data from the computer systems operating system, user files, etc. can include repeated data. In order to deduplicate underlying file system data, within the different computing environments, deduplication metadata is generated that describes the relationship between the actual data stored on disk, or in memory, and the data files, application, etc. within the file system. In the event of an unclean shutdown, such as a shutdown due to a system failure, loss of power, improper shutdown procedure, emergency, etc., the deduplication metadata should be brought in line with the file system data. During this process, which can be referred to as file system recovery, user access to the underlying file system data is delayed until the file system recovery is completed. This duration of the delay is proportional to the used storage space of the file system, which for large scale systems, can take many minutes. Such a delay is often unacceptable to users, especially for users of high availability systems.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus is disclosed herein for reconstructing and checking the consistency of deduplication metadata after an unclean shutdown of a deduplication computing system. In embodiments discussed herein, for deduplication based computing systems, unclean shutdowns (e.g., shutdowns that are the result of power failure, hardware failure, emergency, improper system procedure, etc.) can cause file system data and associated deduplication data to go out of sync. That is, the deduplication metadata, which describes the relationship and references among the underlying file system data, may not reflect the current state of the file system following the unclean shutdown. Therefore, in one embodiment, following an unclean shutdown, the file system is remounted. Following the remounting of the file system, a deduplication metadata reconstruction and consistency checking process is initiated to bring the deduplication metadata up to date with the underlying file system data. In one embodiment, a user operation is received during the reconstruction and consistency checking. Rather than delaying this user operation until after the deduplication metadata recovery and consistency checking is completed, as will be discussed in greater detail below, reconstruction and consistency checking operations are processed with the user operation.

Figure 1:
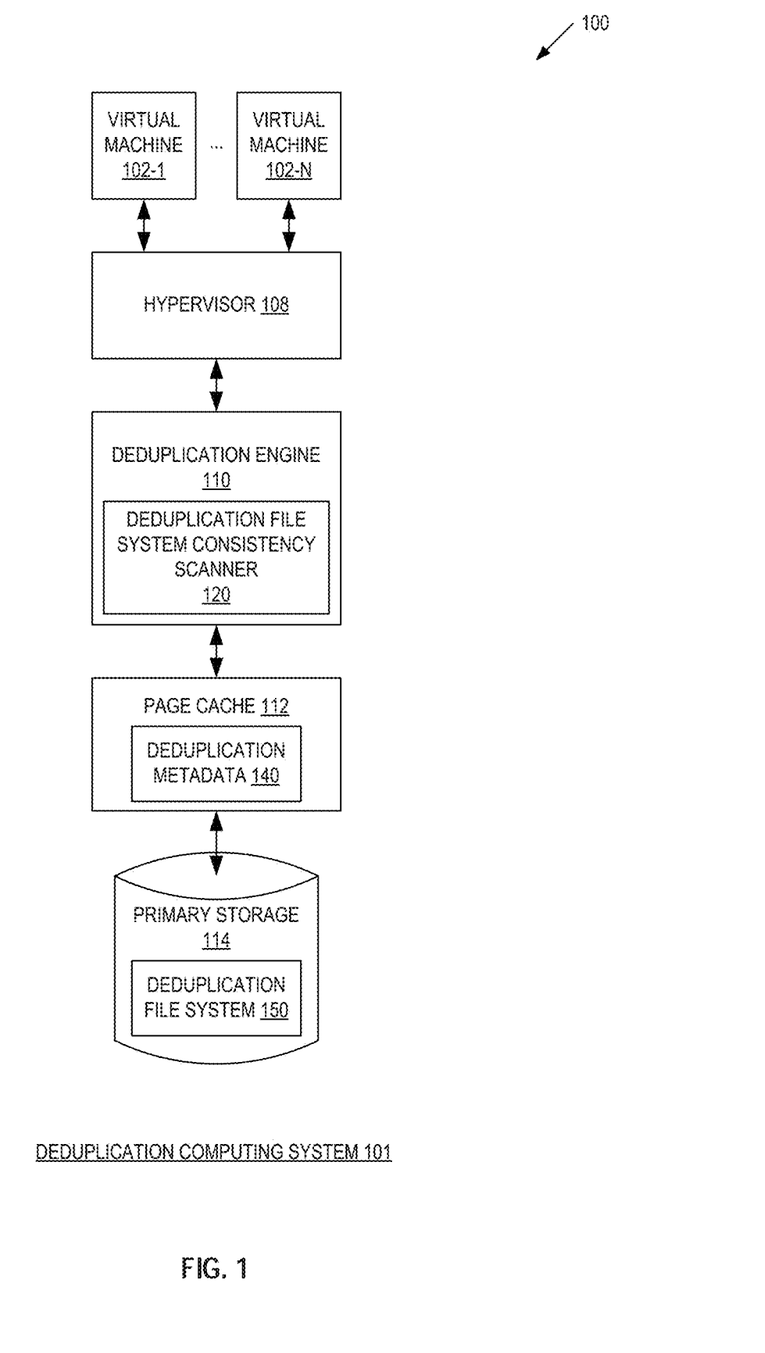
FIG. 1 is a block diagram of exemplary system architecture of a deduplication computing system for reconstruction and checking of the consistency of deduplication metadata after an unclean shutdown of the deduplication computing system.

FIG. 1 is a block diagram of exemplary system architecture 100 of a deduplication computing system for reconstruction and consistency checking of deduplication metadata after an unclean shutdown of the deduplication computing system 101. In one embodiment, deduplication computing system 101 provides a virtualized computing environment that includes one or more virtual machines (i.e., VM 102-1 through 102-N), hypervisor 108, deduplication engine 110, page cache 112, and primary storage 114. The number, type, configuration, topology, connections, or other aspects of deduplication computing system 101, may be varied and are not limited to the examples shown and described. For example, VM 102-1 through 102-N could be physical computing nodes in a physical computing system, as well as a combination of virtual and physical nodes. Furthermore, although virtualized computing environments are described herein with respect to reconstruction and consistency checking of deduplication metadata after an unclean shutdown, the techniques described herein should not be construed as being limited to virtualized computing environments. Rather, various types of computing environments, including different physical or virtual computing environments in which data deduplication is used, can utilize the techniques for reconstruction and consistency checking of deduplication metadata after an unclean shutdown, as discussed herein.

In deduplication computing system 101, a virtual machine (i.e., VM 102-1 through 102-N) may be an instance of an operating system running on various types of hardware, software, circuitry, or a combination thereof (e.g., x86 servers) that are managed by hypervisor 108. As shown, deduplication engine 110 may be used to deduplicate data using page cache 112 as a memory into which data may be read or written before being asynchronously (or, in some embodiments, synchronously) written back to primary storage 114. In one embodiment, deduplication engine 110 can be run on a physical computing node in the deduplication computing system 101. In another embodiment, deduplication engine 110 can be run by a virtual computing node in the deduplication computing system 101, such as one of virtual machines 102-1 through 102-N.

In one embodiment, deduplication engine 110 removes duplicate information in VM files in a read or write path of the virtualized computing environments (i.e., Virtual Desktop Infrastructure (VDI)/Hosted Virtual Desktop ("HVD")) of the deduplication computing system 101. Duplicate information is any block of information that is already stored from a prior copy of the same data or from a different data set. In one embodiment, deduplication engine 110 is configured to eliminate duplicate copies of data to effect a form of data compression to maximize storage capacity of deduplication file system 150 data, and minimize time to storage. In a deduplication-based file system, such as those implemented by deduplication computing system 101, deduplication engine 110 identifies duplicate copies of data, and implements reference links within a file to point to the original data rather than storing another, redundant copy. As a result, duplicate data is not stored according to embodiments discussed herein. For example, deduplication engine 110 can store a reference link to the original data, instead of storing the duplicate data, in the form of deduplication metadata 140, which functions to describe the relationship between the original data and the deduplicated data maintained within the files, directories, user data, etc. of deduplication file system 150. Examples of techniques used in deduplication of virtual machine files are described in U.S. Pat. No. 8,996,800, entitled "Deduplication of Virtual Machine Files in a Virtualized Desktop Environment," which is incorporated herein in its entirety.

In embodiments discussed herein, deduplication engine 110 stores deduplication metadata 140 in at least a deduplication block table in page cache 112. The deduplication metadata 140 within the deduplication block table maps the relationships between the deduplicated data and the original data, by maintaining a number of references to a block of data, maintaining a unique identifier for the block of data, maintaining a logical block number associated with a physical storage location of the data block, maintaining a reference link that associates the block of deduplication metadata to a physical location where the corresponding data block for the file can be located, as well as other deduplication metadata. In one embodiment, the unique identifier is a checksum or hash value generated by a hashing function, such as a SHA-1, MD5, etc. function, applied to data.

In some embodiments, a virtualized computing environment may be composed of a plurality of VMs, such as virtual machine 101-1 and 102-N, running desktop operating systems (e.g., Windows XP or Windows 7 Enterprise by MICROSOFT CORPORATION® of Redmond, Wash.) on a virtualized hardware layer (such as those provided by companies such as VMWARE®, CITRIX®, MICROSOFT®, REDHAT®, or other makes of operating systems). A virtualized software layer (e.g., hypervisor 108) provides memory, disk (e.g., storage), and processing (i.e., CPU) resources to the VMs. The plurality of VMs, in one embodiment, access storage through deduplication engine 110.

In one embodiment, deduplication engine 110 is configured to identify and remove duplicate information from deduplication file system 150, by replacing the duplicate information with pointers to a single copy of data, while a write operation from one or more of the VMs is still "in-flight" (i.e., sent to, but not written to permanent storage or disk (hereafter referred to as "primary storage")). In one embodiment, these data operations can be referred to as user operations or user ops, and can be the result of a user interacting with one of the virtual machines 102-1 through 102-N. In one embodiment, the deduplication uses page cache 112 of a deduplication engine 110 for storage of deduplication metadata 140 associated with the deduplication file system 150.

Page cache 112 is a non-persistent memory for use by deduplication engine 110, such as general purpose random access memory ("RAM"), or other volatile memory that requires power to maintain the data stored therein. In one embodiment, as discussed below, data from page cache 112 is periodically flushed, or committed, to primary storage 114. In one embodiment, deduplication engine 110 may be configured to perform various user operations (e.g., read, write, copy on write, overwrite, redirect, and other operations) on blocks of fixed lengths, such as 4 kilobyte blocks. In another embodiment, blocks of variable lengths may be processed by deduplication engine 110 in accordance with the description herein. In one embodiment, the deduplication engine 110 performs deduplication in response to user ops in the data path or connection between a VM and primary storage 114, in real time or substantially real-time as the data is in-flight from one or more of VMs 102-$i$ and 102-N to primary storage 114.

Primary storage 114 may be implemented using a computer hard disk based on rotational spindle, a computer hard disk based on Solid State Technologies, a redundant array of independent disks (hereafter "RAID") storage system that aggregates multiple computer hard disks, a storage area network (hereafter "SAN"), network attached storage (hereafter "NAS") that aggregates multiple RAID storage systems, among others. That is, primary storage 114 is a persistent, non-volatile memory that does not require power to maintain the data stored therein. In one embodiment, deduplication file system 150 data maintained in primary storage 114.

Because deduplication metadata 140 is maintained in page cache 112 (e.g., a volatile storage) and deduplication file system 150 is maintained in primary storage 114 (e.g., a non-volatile storage), in the event of an unclean shutdown of the deduplication computing system, deduplication metadata 140 may either be lost, or deduplication metadata that is periodically flushed to primary storage 114 may be out of sync with deduplication file system 150. In one embodiment, deduplication engine includes deduplication file system consistency scanner 120 to reconstruct deduplication metadata to reflect the deduplicated data within deduplication file system 150. That is, deduplication file system consistency scanner 120 gathers block usage information for file system 150 to build and check the relationship between the original data and the deduplicated data maintained within the files, directories, user data, etc. of deduplication file system 150. The block information usage is then used to reconstruct deduplication metadata 140 after the unclean shutdown so that it is consistent with the data of deduplication file system 150.

In one embodiment, deduplication file system consistency scanner 120 ensures the high availability of deduplication computing system by servicing user ops from one or more of virtual machines 102-1 through 102-N while deduplication file system consistency scanner 120 is performing the reconstruction and consistency checking operations. As will be discussed in greater detail below, the reconstruction and consistency checking performed by deduplication file system consistency scanner 120, and the servicing of user operations by deduplication engine 110 to access data in deduplication file system 150, are coordinated by deduplication file system consistency scanner 120 during reconstruction of deduplication metadata 140.

In one embodiment, after the deduplication file system 150 is mounted by deduplication engine 110 following the unclean shutdown, deduplication file system consistency scanner 120 generates a data structure that will track/gather information about file system blocks and their usage. Deduplication file system consistency scanner 120 then performs a number of scanning operations on the file system 150 (e.g., scanning fixed blocks of the file system, scanning file system inodes, scanning branches of each inode data structure) to gather the data that will populate the data structure tracking file system block usage. This data is then used to synchronize the deduplication metadata 140 (e.g., which is either reconstructed from scratch or from an out of date copy previously stored by primary storage 114) with the actual deduplication file system 150 image on primary storage 114.

In one embodiment, while deduplication file system consistency scanner 120 performs the various scanning operations to synchronize the deduplication metadata 140 and deduplication file system 150, deduplication file system consistency scanner 120 also accepts user ops (e.g., user requests to access data in the deduplication file system 150) for processing during the scanning. In one embodiment, the user ops can be accepted and processed by deduplication engine 110 after the file system has been mounted following an unclean shutdown, and before completion of the consistency scanning and checking of deduplication metadata 140. As will be discussed in greater detail below, consistency checking is done inline with the user ops by using the target file system data block of the user op to kick off scanning operations for that data block.

Figure 4A:
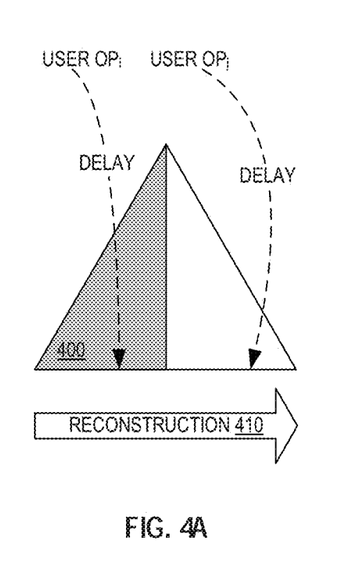
FIG. 4A is an illustration of user operation delay during reconstruction and consistency checking of deduplication metadata after an unclean shutdown of a deduplication computing system.
Figure 4B:
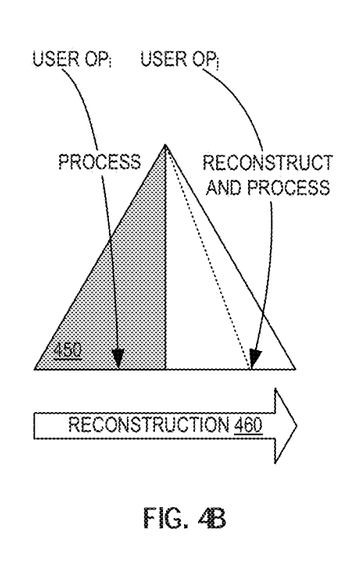
FIG. 4B is an illustration of one embodiment of a reconstruction and consistency checking of deduplication metadata after an unclean shutdown of a deduplication computing system.

As illustrated in FIG. 4A, a deduplication file system 400 is illustrated, where deduplication metadata is being reconstructed 410 following an unclean shutdown of a deduplication computing system. Some systems would receive user $op_i$ and user $op_j$, and delay/lock the processing of those user ops until the entire file system has been scanned and metadata synchronized with the file system image. Such a system would delay the time to operation by up to several minutes, which would be an unacceptable delay for a high availability system. However, as illustrated in FIG. 4B, during reconstruction 460 of deduplication metadata for file system 450, user $op_i$ could be processed immediately (or within a very short duration based on its queuing order, as discussed below) because the data block that is the target of user $op_i$ has already been scanned and usage of the block tracked. Similarly, user $op_j$ can be processed before reconstruction 460 of metadata is complete. In one embodiment, in response to receipt of user $op_j$, deduplication file system consistency scanner 120 causes a scanning to be performed on the inode, tree, and branch within file system 450 associated with the target data block of the operation. That is, deduplication file system consistency scanner 120 performs the scans of the block usage of the deduplication file system 150 along a specified branch of the file system. When this scan is done, user $op_j$ can be processed by deduplication engine 110 even though reconstruction and consistency checking is not finished. In one embodiment, the scanning and accounting of block usage associated with the user operation is also tracked with respect to the deduplication metadata, so that reconstruction does not rescan and/or double count deduplication metadata 140 when an ordered reconstruction reaches that particular inode, tree, and branch while scanning file system 150. In the embodiments discussed herein, user $op_i$ can be processed immediately and user $op_j$ would experience a slight delay on the magnitude of milliseconds while the scanners complete the limited scan and consistency check for the data block that is the target of the user op. This is a significant improvement over systems that delay all user ops until reconstruction of deduplication metadata is completed, as illustrated in FIG. 4A.

Figure 2:
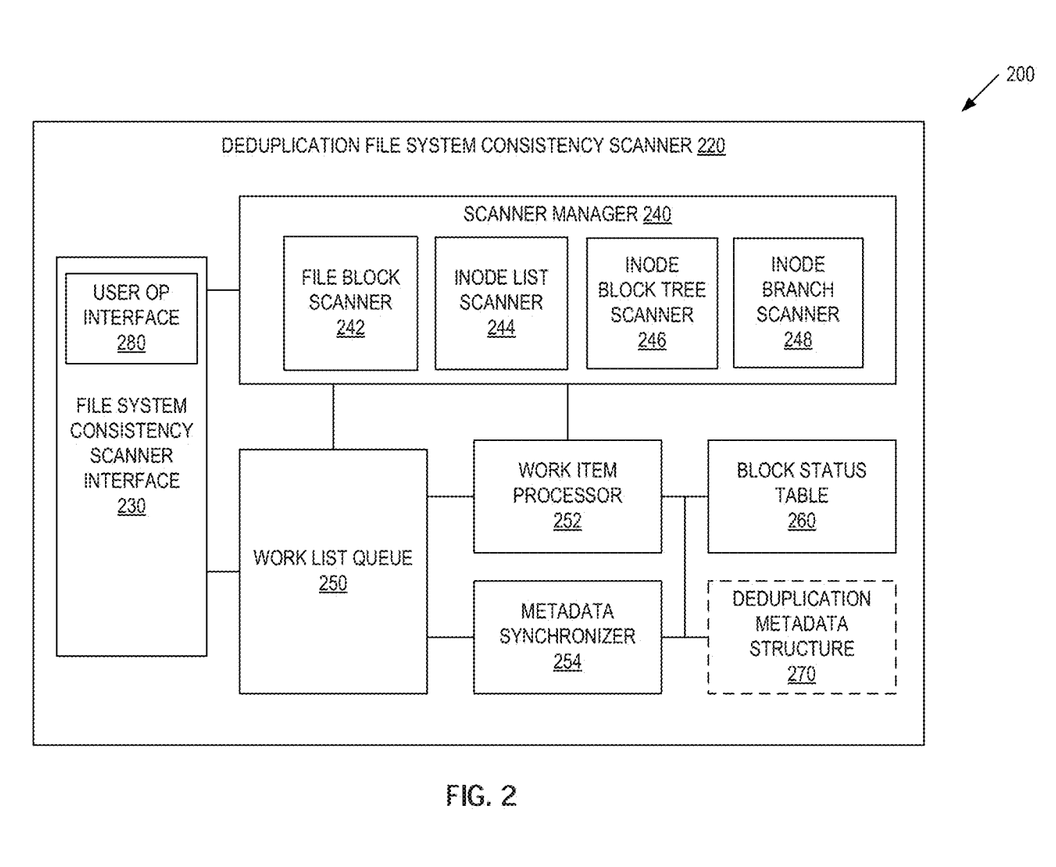
FIG. 2 is an illustration of one embodiment of a deduplication file system consistency scanner.

FIG. 2 is an illustration of one embodiment 200 of an deduplication file system consistency scanner 220. Deduplication file system consistency scanner 220 provides additional details for the deduplication file system consistency scanner 120 of deduplication engine 110 discussed above in FIG. 1. Deduplication file system consistency scanner 220 performs block usage scanning of a deduplication file system to reconstruct, and ensure the constancy of, deduplication metadata that describes the underlying data of a deduplication file system. In one embodiment, deduplication file system consistency scanner 220 includes a file system consistency scanner interface 230, a scanner manager 240, a work list queue 250, work item processor 252, metadata synchronizer 254, and block status table 260. Deduplication file system consistency scanner 220 may also include a deduplication metadata structure 270. However, deduplication metadata structure can also be maintained separate from deduplication file system consistency scanner 220 in, for example, a non-volatile storage of a deduplication computing system.

In one embodiment, following an unclean shutdown of a deduplication computing system, a deduplication file system can be mounted in a non-volatile storage of the deduplication computing system. Due to the unclean shutdown, file system consistency scanner interface 230 receives a command to perform deduplication metadata reconstruction and consistency checking from a deduplication engine (e.g., deduplication engine 110). In one embodiment, the scanning to be performed by deduplication file system consistency scanner 220 is initiated following the mounting of the deduplication file system. Furthermore, as discussed herein, one or more user ops (e.g., reads, writes, directory operations, etc.) can also be processed by a deduplication engine on the deduplication file system following the mount operation, and without waiting for the scanning to be completed.

In one embodiment, block status table 260 is allocated by deduplication file system consistency scanner 220 for the reconstruction and consistency checking initiated by file system consistency scanner interface 230. The allocated block status table 260 keeps the gathered data, generated by the various scanners discussed below, about deduplication file system blocks and their usage, along with other important reconstruction and consistency data. In one embodiment, the block status table 260 holds, for each block of the deduplication file system, a reference count, a block type (e.g., file system metadata or user data), whether the block has been visited by a scanner, whether the block has been synchronized with the deduplication metadata structure 270, and whether the block is allocated during the reconstruction and consistency checking.

In one embodiment, work list queue 250 is a pool where all work to be performed by scanners 242-248 that account for used blocks of a deduplication file system, and complete block status table 260, is generated. The work list queue 250 forms an ordered work list of items to be processed as threads by work item processor 252. Although one work item processor 252 is illustrated, there may be a plurality of work item processors 252 capable of processing a plurality of threads corresponding to a plurality of work items within the work list queue 250 in parallel with one another. In one embodiment, any of file block scanner 242, inode list scanner 244, inode block tree scanner 246, inode branch scanner 248, and a user op can create work items and enqueue them in the work list queue 250. In one embodiment, the number of work items allowed within the work list queue 250 is limited to enable the enqueueing and processing of user ops along with the scanning operations discussed herein.

In one embodiment, following the mounting of a deduplication file system after an unclean shutdown, scanner manager 240 enqueues a scanning thread in work list queue that causes one or more of file block scanner 242, inode list scanner 244, inode block tree scanner 246, and inode branch scanner 248 to generate work items for scanning each part of the mounted deduplication file system. The work items generated by scanners 242-248 scan the entire deduplication file system, which has just been mounted, to account for all used blocks of the deduplication file system and to count references to user data blocks.

In one embodiment, blocks of data within the deduplication file system are categorized into data blocks and metadata blocks. Data blocks contain user data, and are referred to from an inode or indirectly from another block. Metadata blocks are blocks that contain data concerning the deduplication file system itself (e.g., length of file system, structure of file system, etc.), and can either be terminal (e.g., do not contain pointers to other blocks) or intermediate (e.g., contain pointers to other blocks). In one embodiment, file block scanner 242 scans the fixed/terminal metadata blocks of the file system, and inode list scanner 244 find all blocks accessible through file system inodes, including the intermediate metadata blocks.

In one embodiment, file block scanner 242 enqueues work items in work list queue 250 for processing by work item processor 252 to find all fixed blocks of the deduplication file system, and mark them as fixed blocks in the block status table 260. In one embodiment, the fixed blocks located by file block scanner 242 correspond to terminal metadata blocks. Since the scanning of these fixed blocks, and accounting for them in the block status table 260, can be done in a short amount of time, in one embodiment, the file block scanning 242 is completed at mount time before other work items from other scanners/user ops are enqueued in the work list 250. Furthermore, by scanning and accounting for these fixed, terminal metadata blocks before performing other scanning, invalid block sharing can be detected if other file system blocks reference one of the fixed blocks.

In one embodiment, following file block scanner 242 scanning the fixed blocks in the deduplication file system, inode list scanner 244 initiates the finding of all blocks used by the inodes of a deduplication file system. In one embodiment, inode list scanner 244 enqueues a work item in work list queue 250 for each inode of the deduplication file system, from the first inode to the last inode. Then, each these work items, enqueued by inode list scanner 244 triggers an inode block tree scanner 246 work item and an inode branch scanner 248 work item.

In one embodiment, each inode block tree scanner 246 work item enqueued in work list queue 250 loads an inode whose number is in the work item, and scans the inode block containing the associated inode, and causes inode branch scanner 248 to generate a work item for enqueueing in the work list queue 250. The inode branch scanner 248 work item is processed to check a branch of the block tree of the inode from the inode all the way down to a base file block of the inode. In one embodiment, inode branch scanner 248 enqueues a sufficient number of work items for scanning branches of the inode to ensure that each indirectly referenced block in the inode can be processed by its own thread/work item independent of other worker blocks.

Each work item enqueues in work list queue 250 by inode branch scanner 248 processes a branch of a block tree of an inode within the deduplication file system. When processing the branch specified in the enqueued work item, the branch is processed from the top down to account for blocks that contain intermediate metadata, i.e., blocks referenced indirectly by two or more pointers, which are accounted for in block status table 260 and marked as visited. Since metadata blocks can be referenced only once (e.g., metadata sharing is not allowed), data corruption can be detected if another block tries to reference an already claimed metadata block. However, blocks of data that are referenced by the scanning of branch are considered to be data blocks, and the reference count number data field of the block status table 260 for the block is incremented.

In parallel with the generation and enqueueing of scanning work items, one or more user ops (e.g., operations to read, write, edit blocks of file system data) can be received by user op interface 280. In one embodiment, in response to receiving a user op, user op interface 280 requests scanner manager 240 to scan the branch of an inode in the file system associated with the data block that is the target of the user op. If the branch has already been scanned, this can be quickly determined based on the data within block status table 260, and the user op is allowed to proceed. However, if the branch has not been scanned, the various work items discussed above can be enqueued for the branch leading to the base file block of the file system associated with the user operation. After the branch scanning is completed, and the data is accounted for in the block status table 260, the user op is allowed to proceed. In the embodiments discussed herein, the blocks in the selected branch of the selected inode are processed by the deduplication file system consistency scanner 220 before user access to the data is allowed.

Metadata synchronizer 254 is responsible for synchronizing the data gathered by scanners 242-248 and recorded in block status table 260 with the deduplication metadata structure 270. However, before synchronizing the block status table 260 and the deduplication metadata structure 270, metadata synchronizer 254 ensures that all work items in the work list queue 250 are finished being processed. Metadata synchronizer 254 first looks to work list queue 250 to verify that the work list is empty, which implies that all parts of the deduplication file system reachable by inodes have been scanned. Metadata synchronizer 254 also waits for all unfinished truncate operations that started while the scanners were running to finish.

After metadata synchronizer 254 ensures these two conditions are met, metadata synchronizer 254 synchronizes the block status table 260 and the deduplication metadata structure 270. Metadata synchronizer 254, in a first synchronization phase, scans deduplication metadata structure 270 sequentially and checks references counts in deduplication metadata structure 270 against the corresponding counts in block status table 260. Since the reference counts in the block status table 260 were generated by scanning and account for the data in the actual deduplication file system image, the data reference counts in the block status table 260 replace the reference count in the deduplication metadata structure when there is an inconsistency. Metadata synchronizer 254, in a second synchronization phase, then adds blocks to deduplication metadata structure 270 for all used blocks of block status table 260 that do not have corresponding entries within deduplication metadata structure 270. This phase ensures that deduplication metadata structure 270 has an accurate description of the entire deduplication file system.

In one embodiment, after metadata synchronizer 254 finishes the two synchronization phase, the deduplication metadata reconstruction is finished, and consistency with the actual deduplication file system image is ensured. Deduplication file system consistency scanner 220 then performs one or more clean-up operations, such as deallocating the memory used for the block status table 260, ensuring the user ops need not go through deduplication file system consistency scanner 220 before being processed by a deduplication engine, as well as other clean-up operations.

Figure 3:
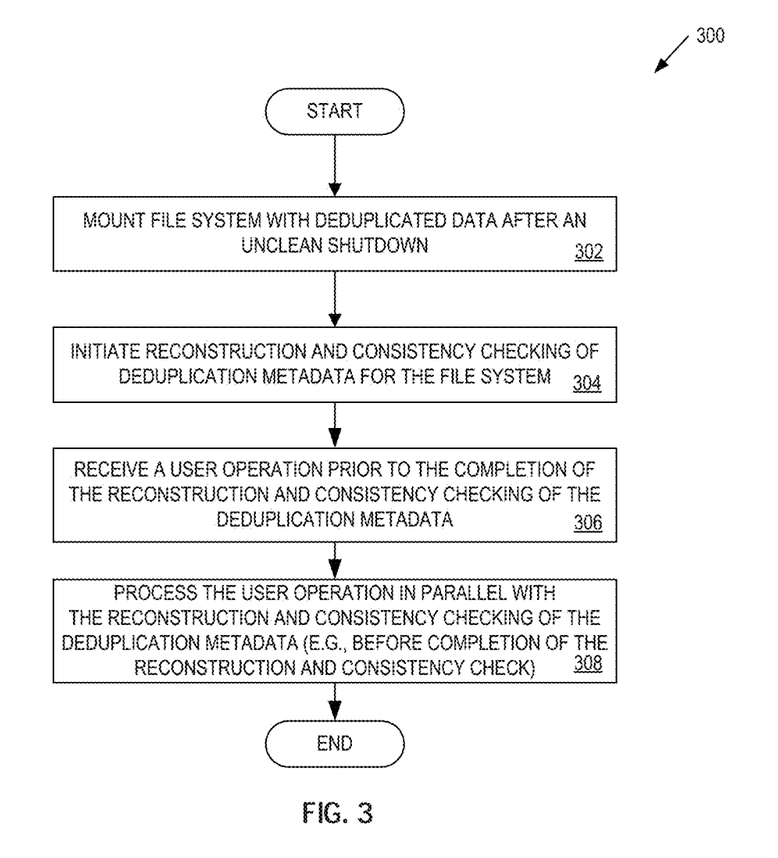
FIG. 3 is a flow diagram of one embodiment of a method for performing reconstruction and consistency checking of deduplication file system metadata after an unclean shutdown of a deduplication computing system.

FIG. 3 is a flow diagram of one embodiment of a method for performing reconstruction and consistency checking of deduplication file system metadata after an unclean shutdown of a deduplication computing system. The method 300 is performed by processing logic that may comprise hardware (circuitry, dedicated logic, etc.), software (run on a general purpose computer system or a dedicated machine), firmware, or a combination. In one embodiment, the method 300 is performed by a deduplication file system consistency scanner 220, such as the deduplication file system consistency scanner 220 described above with respect to FIG. 2.

Referring to FIG. 3, the process begins by mounting a file system with deduplicated data after an unclean shutdown (processing block 302). In one embodiment, a prior, outdated version of a deduplication metadata structure can also be loaded by processing logic as part of mounting the file system. Furthermore, both of these operations can occur after a loss of power, improper shutdown, system crash, etc. of a deduplication computing system utilizing the file system.

Processing logic then initiates reconstruction and consistency checking of deduplication metadata for the file system (processing block 304). In one embodiment, the reconstruction and consistency checking accounts for all used blocks, user data blocks and file system metadata blocks, in the file system. As discussed herein, each block is accounted for by scanning fixed blocks of the file system, and then performing an ordered scan of each inode, tree, and branch contained within the file system. Furthermore, as discussed above, the scanning operations can be performed in parallel with one another.

Processing logic receives a user operation prior to completion of the reconstruction and consistency checking of the deduplication metadata (processing block 306). Processing logic then processes the user operation in parallel with the reconstruction and consistency checking of the deduplication metadata (processing block 308). That is, processing logic processes user ops with the reconstruction and scanning operations, discussed herein, before the completion of the reconstruction and consistency checking. By processing user ops with the reconstruction and consistency checking, processing logic is able bring the file system back online for the deduplication computing system to serve user operations in a very short amount of time, which is important in high availability systems. Furthermore, any delay in processing user operations the reconstruction/consistency checking operations, is very small when compared to delaying user operations until after a recovery process has been completed.

Figure 5:
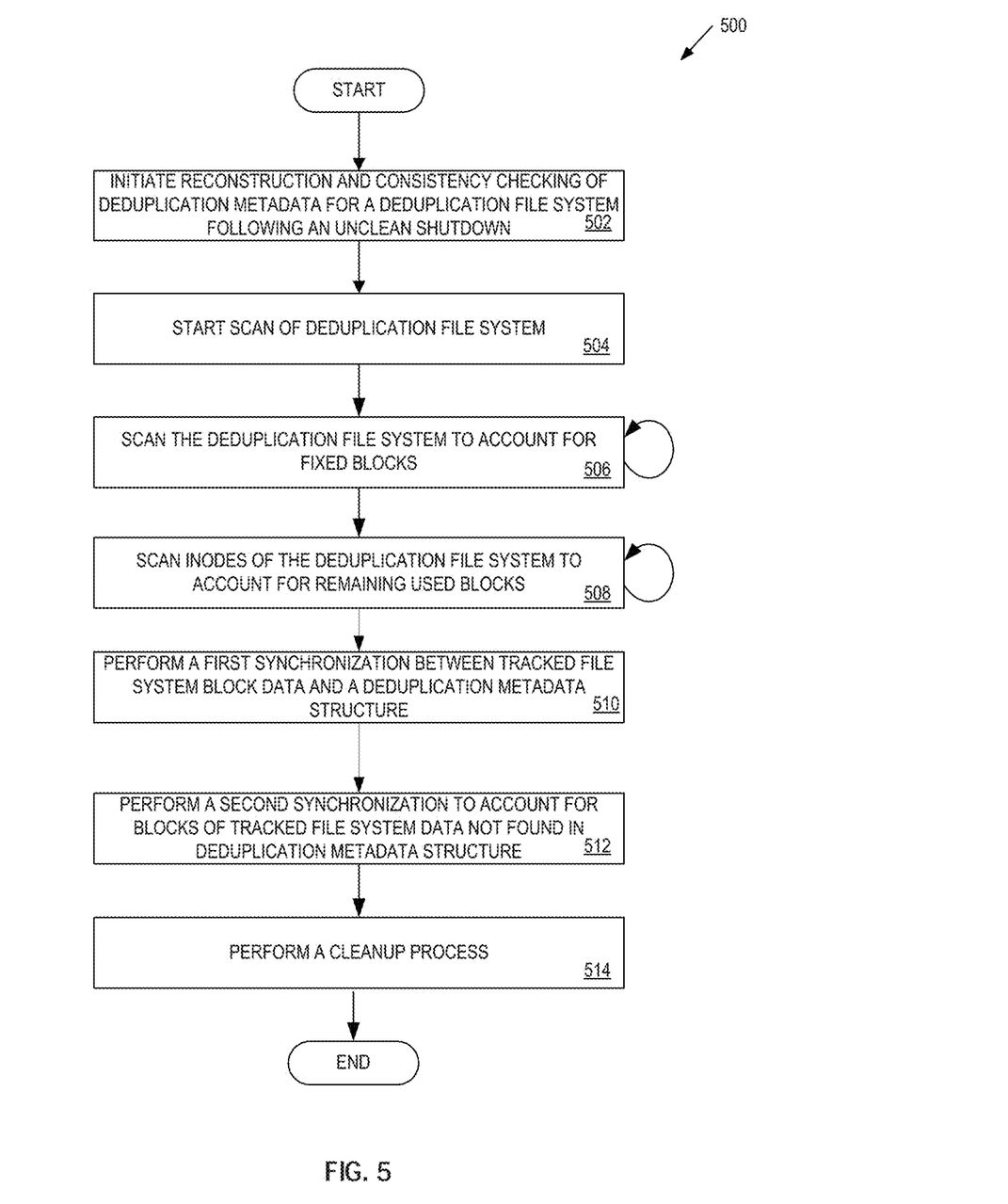
FIG. 5 is a flow diagram of one embodiment of a method for performing reconstruction and consistency checking of deduplication metadata following an unclean deduplication computing system shutdown.

FIG. 5 is a flow diagram of one embodiment of a method 500 for performing reconstruction and consistency checking of deduplication file system metadata following an unclean deduplication computing system shutdown. The method 500 is performed by processing logic that may comprise hardware (circuitry, dedicated logic, etc.), software (run on a general purpose computer system or a dedicated machine), firmware, or a combination. In one embodiment, the method 500 is performed by an deduplication file system consistency scanner 220, such as the deduplication file system consistency scanner 220 described above with respect to FIG. 2.

Referring to FIG. 5, the process begins by initiating reconstruction and consistency checking of deduplication metadata for a deduplication file system following an unclean shutdown (processing block 502). In one embodiment, initiation of the reconstruction and consistency checking by processing logic include the allocation of a block status table to track, for each block of the deduplication file system, scanning and consistency data, as discussed herein. Processing logic begins the reconstruction and consistency checking by starting a scan of the deduplication file system (processing block 504). As discussed above, the scan will go through all blocks, ides, inode branches, deduplication file system metadata, etc. to determine block usage within the mounted deduplication file system.

Processing logic will perform two scanning phases of the deduplication file system including scanning the deduplication file system to account for fixed blocks (processing block 506). The first scanning phase analyzes the file system to locate and account for file system metadata blocks, which are not accessible from inodes of the deduplication file system. These blocks are accounted for in the block status table. Processing logic then scans inodes of the deduplication file system to account for the remaining used blocks (processing block 508). In the second scanning phase, all inodes in the file system are scanned in order, where scanning an inode includes scanning the inode tree using a top down approach of all branches within each inode tree. The scanning go the inodes, as discussed herein, ensures that indirectly referenced file system metadata and reference counts for user data blocks are also accounted for in the block status table.

After the scanning phases are completed, and all data blocks of the deduplication file system have been scanned and accounted for, processing logic performs a first synchronization between tracked file system block data and a deduplication metadata structure (processing block 510). The first synchronization ensures that the actual references counts associated with data blocks of the deduplication file system, as determined from the scanning and accounting performed during processing blocks 506 and 508, and used within the deduplication metadata structure. Once the reference counts are resolved, processing logic performs a second synchronization to account for blocks of tracked deduplication file system data not found in the deduplication metadata structure (processing block 512). That is, any data not present within the deduplication metadata structure can be added based on the accounting and tracking data within the block status table.

Processing logic then performs one or more cleanup operations (processing block 514). The cleanup operations can include deallocating temporary data structures created during the scanning process, deleting and deallocating the block status table, as well as other memory cleanup operations.

Figure 6:
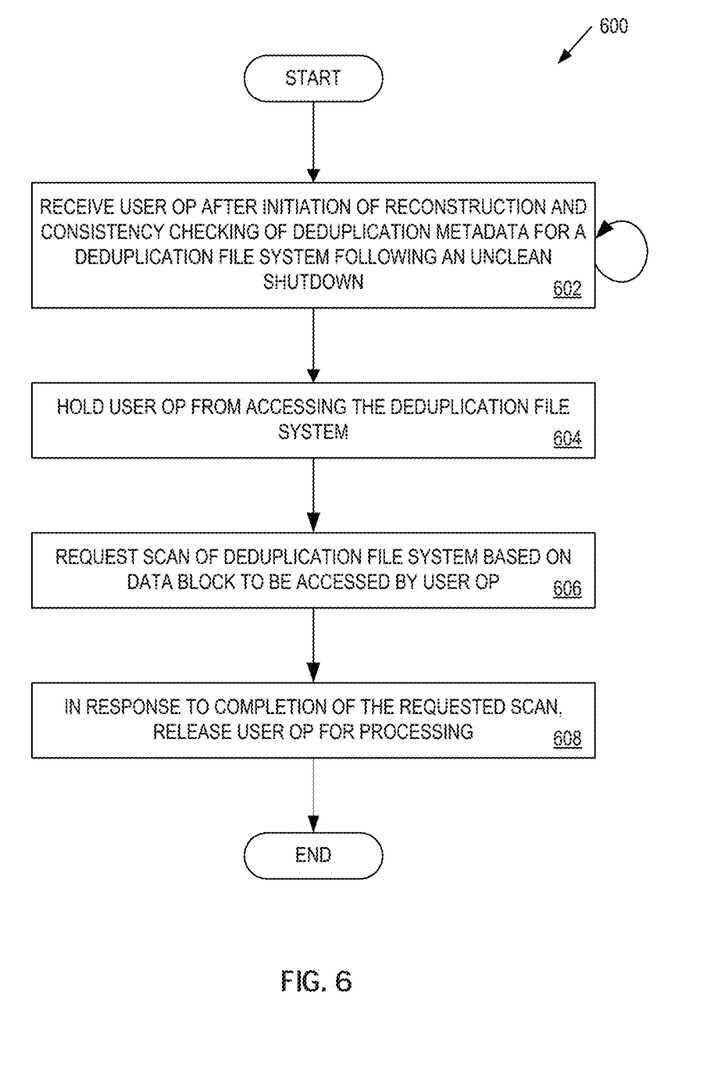
FIG. 6 is a flow diagram of one embodiment of a method for processing a user operation on a deduplication file system during reconstruction and consistency checking of the deduplication metadata following an unclean deduplication computing system shutdown.

FIG. 6 is a flow diagram of one embodiment of a method 600 for processing a user operation on a deduplication file system during reconstruction and consistency checking of the deduplication file system metadata following an unclean deduplication computing system shutdown. The method 600 is performed by processing logic that may comprise hardware (circuitry, dedicated logic, etc.), software (run on a general purpose computer system or a dedicated machine), firmware, or a combination. In one embodiment, the method 600 is performed by an deduplication file system consistency scanner 220, such as the deduplication file system consistency scanner 220 described above with respect to FIG. 2.

Referring to FIG. 6, the process begins by receiving a user op after initiation of reconstruction and consistency checking of deduplication metadata for a deduplication file system following an unclean shutdown (processing block 602). The user op can be a request to access deduplication file system data for reading, writing, modifying, etc. the deduplication file system data. Processing logic hold the user operation from accessing the deduplication file system (processing block 604). As discussed herein, the hold is a temporary and brief hold enforced on the user op until the subsequent processing blocks are completed.

Processing logic requests a scan of the deduplication file system based on a data block to be accessed by the user op (processing block 606). The user op will identify the data by file block number (e.g., the number/identifier associated with a block of data within the file system). Based on the file block number, processing logic requests the scanning that was described in processing block 508 of FIG. 5 to be performed. However, instead of the organized and exhaustive file system scan, only the branch of the inode to be accessed by the user op is scanned, accounted for, and tracked, as discussed herein.

In response to completion of the requested scan, the user operation is released for processing (processing block 608). In one embodiment, the release of the user operation occurs before completion of the deduplication metadata reconstruction and consistency checking discussed above. Furthermore, by enabling the user op to proceed before completion of the entire reconstruction and consistency checking process, the downtime resulting from the unclean shutdown is minimized. Thus, the high availability of a deduplication computing system, embodying the techniques discussed herein, can be ensured.

Figure 7:
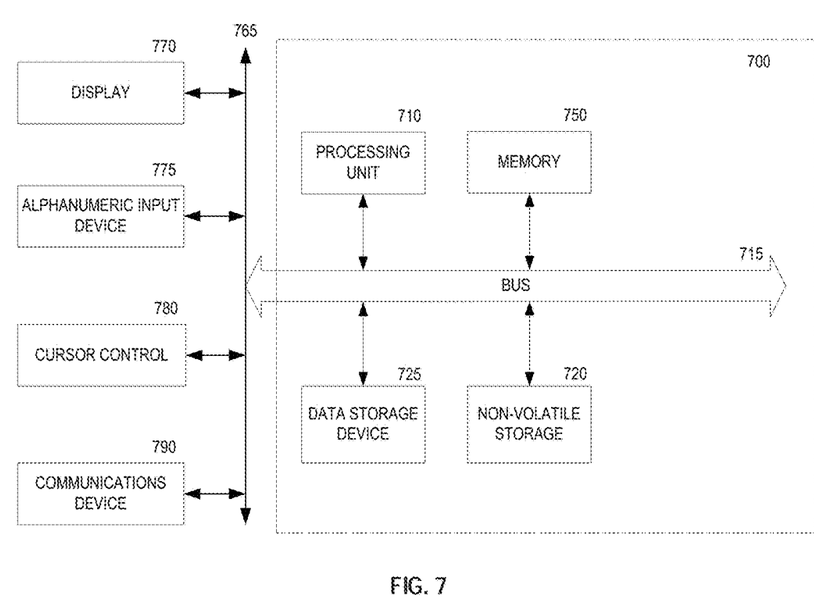
FIG. 7 illustrates an example schematic drawing of a computer network infrastructure.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 610. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light-emitting diode display (LED display) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, touchpad, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a special purpose appliance including a subset of the computer hardware components described above. For example, the appliance may include a processor 610, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "mounting", "initiating", "receiving", "processing", "allocating", "performing", "scanning", "determining", "synchronizing", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-implemented method comprising:
    mounting a deduplication file system to a non-volatile storage of a deduplication computing system after an unclean shutdown of the deduplication computing system;
    initiating a reconstruction and consistency check of deduplication metadata in a volatile storage of the deduplication computing system, wherein the deduplication metadata is associated with the deduplication file system and describes a relationship between the deduplication metadata in the volatile storage and a physical location of blocks of deduplicated data stored in the non-volatile storage;
    receiving, by the deduplication computing systems, a user operation that accesses a file block in a portion of the deduplication file system for which the reconstruction and consistency checking of the deduplication metadata has not been completed; and
    processing, by the deduplication computing system before completion of the reconstruction and consistency check of the deduplication metadata, the user operation in parallel with the reconstruction and consistency check of the deduplication metadata by: performing reconstruction and consistency checking for the file block that is associated with the received user operation, processing the user operation after the reconstruction and consistency checking for the file block is completed, and continuing to perform the reconstruction and consistency checking of the deduplication metadata for the remainder of the deduplication file system for which the reconstruction and consistency checking of the deduplication metadata has not been completed.

2. The computer-implemented method of claim 1, further comprising:
    performing the reconstruction and consistency check of deduplication metadata to account for used data blocks and file system metadata blocks of the deduplication file system.

3. The computer-implemented method of claim 2, wherein performing the reconstruction and consistency check further comprises:
    allocating a block status table to track, for each block of the deduplication file system, block usage and reference counts associated with said blocks;
    scanning fixed blocks of the deduplication file system to locate and account for deduplication file system metadata blocks in the block status table; and
    scanning inodes of the deduplication file system in order, and for each inode scanning each branch of the inode, to locate user data blocks and references counts for the data blocks in the block status table.

4. The method of claim 3, wherein processing the user operation in parallel with the reconstruction and consistency check of the deduplication metadata further comprises:
    determining a file block that is associated with the received user operation;
    scanning a selected branch of an inode where the file block is located within the deduplication file system to locate and update references counts for data blocks in the block status table for the branch; and
    processing the user operation in parallel with the scanning of inodes after scanning of the selected branch is complete.

5. The method of claim 3 further comprising:
    allocating a work pool that comprises a plurality of work items enqueued within the work pool, each work item generated to scan one of a fixed block, an inode, an inode block tree, or an inode branch; and
    processing the work items in an order in which the work items are enqueued in the work list.

6. The computer-implemented method of claim 3, further comprising:
    synchronizing the results of scanning the fixed blocks and the inodes of the deduplication file system with the deduplication metadata by:

performing a first synchronization by updating the deduplication metadata with the reference counts for corresponding blocks from the block status table, and performing a second synchronization to add blocks and reference counts to the deduplication metadata for blocks of user data that exist in the block status table and not in the deduplication metadata.

7. The computer-implemented method of claim 3, wherein the block status table comprises, for each block of the deduplication file system, a reference count, a block type that describes the block as user data or file system metadata, an indication whether the block has been scanned, an indication whether the block has been synchronized with a corresponding block in the deduplication metadata, and an indication whether the block was allocated during the reconstruction and consistency check.

8. The computer-implemented method of claim 1, wherein the deduplication computing system processes data operations in a data path between a virtual machine and non-volatile memory, in real time or substantially real-time.

9. A deduplication computing system comprising:

a non-volatile memory to store a deduplication file system;

a volatile memory to store deduplication metadata associated with the deduplication file system; and a processor coupled with the non-volatile memory and the volatile memory to:

mount the deduplication file system to the non-volatile storage of the deduplication computing system after an unclean shutdown of the deduplication computing system, initiate a reconstruction and consistency check of deduplication metadata in the volatile storage of the deduplication computing system, wherein the deduplication metadata is associated with the deduplication file system and describes a relationship between the deduplication metadata in the volatile storage and a physical location of blocks of deduplicated data stored in the non-volatile storage associated with the deduplication file system, receive a user operation that accesses a file block in a portion of the deduplication file system for which the reconstruction and consistency checking of the deduplication metadata has not been completed, and process, before completion of the reconstruction and consistency check of the deduplication metadata, the user operation in parallel with the reconstruction and consistency check of the deduplication metadata by:

performing reconstruction and consistency checking for the file block that is associated with the received user operation, processing the user operation after the reconstruction and consistency checking for the file block is completed, and continuing to perform the reconstruction and consistency checking of the deduplication metadata for the remainder of the deduplication file system for which the reconstruction and consistency checking of the deduplication metadata has not been completed.

10. The deduplication computing system of claim 9, further comprising the processor configured to:

perform the reconstruction and consistency check of deduplication metadata to account for used data blocks and file system metadata blocks of the deduplication file system.

11. The deduplication computing system of claim 10, wherein the processor to perform the reconstruction and consistency check further comprises the processor configured to:

allocate a block status table to track, for each block of the deduplication file system, block usage and reference counts associated with said blocks, scan fixed blocks of the deduplication file system to locate and account for deduplication file system metadata blocks in the block status table, and scan inodes of the deduplication file system in order, and for each inode scanning each branch of the inode, to locate user data blocks and references counts for the data blocks in the block status table.

12. The deduplication computing system claim 11, wherein the processor to process the user operation in parallel with the reconstruction and consistency check of the deduplication metadata further comprises the processor configured to:

determine a file block that is associated with the received user operation, scan a selected branch of an inode where the file block is located within the deduplication file system to locate and update references counts for data blocks in the block status table for the branch, and process the user operation in parallel with the scanning of inodes after scanning of the selected branch is complete.

13. The deduplication computing system of claim 11, further comprising the processor configured to:

allocate a work pool that comprises a plurality of work items enqueued within the work pool, each work item generated to scan one of a fixed block, an inode, an inode block tree, or an inode branch, and processing the work items in an order in which the work items are enqueued in the work list.

14. The deduplication computing system of claim 11, further comprising the processor configured to:

synchronize the results of scanning the fixed blocks and the inodes of the deduplication file system with the deduplication metadata by:

performing a first synchronization by updating the deduplication metadata with the reference counts for corresponding blocks from the block status table, and performing a second synchronization to add blocks and reference counts to the deduplication metadata for blocks of user data that exist in the block status table and not in the deduplication metadata.

15. The deduplication computing system of claim 11, wherein the block status table comprises, for each block of the deduplication file system, a reference count, a block type that describes the block as user data or file system metadata, an indication whether the block has been scanned, an indication whether the block has been synchronized with a corresponding block in the deduplication metadata, and an indication whether the block was allocated during the reconstruction and consistency check.

16. The deduplication computing system of claim 9, wherein the deduplication computing system processes data operations in a data path between a virtual machine and non-volatile memory, in real time or substantially real-time.

17. An article of manufacture having one or more non-transitory computer readable storage media storing executable instructions thereon which when executed cause a system to perform a method comprising:

mounting a deduplication file system to a non-volatile storage of a deduplication computing system after an unclean shutdown of the deduplication computing system;

initiating a reconstruction and consistency check of deduplication metadata in a volatile storage of the deduplication computing system, wherein the deduplication metadata is associated with the deduplication file system and describes a relationship between the deduplication metadata in the volatile storage and a physical location of blocks of deduplicated data stored in the non-volatile storage;

receiving, by the deduplication computing systems, a user operation that accesses a file block in a portion of the deduplication file system for which the reconstruction and consistency checking of the deduplication metadata has not been completed; and processing, by the deduplication computing system before completion of the reconstruction and consistency check of the deduplication metadata, the user operation in parallel with the reconstruction and consistency check of the deduplication metadata by: performing reconstruction and consistency checking for the file block that is associated with the received user operation, processing the user operation after the reconstruction and consistency checking for the file block is completed, and continuing to perform the reconstruction and consistency checking of the deduplication metadata for the remainder of the deduplication file system for which the reconstruction and consistency checking of the deduplication metadata has not been completed.

18. The article of manufacture of claim 17, further comprising:

performing the reconstruction and consistency check of deduplication metadata to account for used data blocks and file system metadata blocks of the deduplication file system.

19. The article of manufacture of claim 18, wherein performing the reconstruction and consistency check further comprises:

allocating a block status table to track, for each block of the deduplication file system, block usage and reference counts associated with said blocks;

scanning fixed blocks of the deduplication file system to locate and account for deduplication file system metadata blocks in the block status table; and scanning inodes of the deduplication file system in order, and for each inode scanning each branch of the inode, to locate user data blocks and references counts for the data blocks in the block status table.

20. The article of manufacture of claim 19, wherein processing the user operation in parallel with the reconstruction and consistency check of the deduplication metadata further comprises:

determining a file block that is associated with the received user operation;

scanning a selected branch of an inode where the file block is located within the deduplication file system to locate and update references counts for data blocks in the block status table for the branch; and processing the user operation in parallel with the scanning of inodes after scanning of the selected branch is complete.

21. The article of manufacture of claim 19, further comprising:

allocating a work pool that comprises a plurality of work items enqueued within the work pool, each work item generated to scan one of a fixed block, an inode, an inode block tree, or an inode branch; and processing the work items in an order in which the work items are enqueued in the work list.

22. The article of manufacture of claim 19, further comprising:

synchronizing the results of scanning the fixed blocks and the inodes of the deduplication file system with the deduplication metadata by:

performing a first synchronization by updating the deduplication metadata with the reference counts for corresponding blocks from the block status table, and performing a second synchronization to add blocks and reference counts to the deduplication metadata for blocks of user data that exist in the block status table and not in the deduplication metadata.

23. The article of manufacture of claim 19, wherein the block status table comprises, for each block of the deduplication file system, a reference count, a block type that describes the block as user data or file system metadata, an indication whether the block has been scanned, an indication whether the block has been synchronized with a corresponding block in the deduplication metadata, and an indication whether the block was allocated during the reconstruction and consistency check.

24. The article of manufacture of claim 17, wherein the deduplication computing system processes data operations in a data path between a virtual machine and non-volatile memory, in real time or substantially real-time.

* * * * *